US012592649B2

(12) United States Patent
Luo et al.

(10) Patent No.: US 12,592,649 B2
(45) Date of Patent: Mar. 31, 2026

(54) SYNCHRONOUS RECTIFICATION CONTROLLER AND SWITCHING POWER SUPPLY

(71) Applicant: Wuxi Chipown Microelectronics Co., Ltd., Wuxi (CN)

(72) Inventors: Yang Luo, Wuxi (CN); Huaming Guo, Wuxi (CN); Jun Yang, Wuxi (CN); Haisong Li, Wuxi (CN)

(73) Assignee: WUXI CHIPOWN MICROELECTRONICS CO., LTD., Wuxi (CN)

( * ) Notice: Subject to any disclaimer, the term of this patent is extended or adjusted under 35 U.S.C. 154(b) by 156 days.

(21) Appl. No.: 18/487,030

(22) Filed: Oct. 13, 2023

(65) Prior Publication Data

US 2024/0243669 A1     Jul. 18, 2024

(30) Foreign Application Priority Data

Jan. 16, 2023    (CN) .......................... 202310081587.2

(51) Int. Cl.
H02M 3/335 (2006.01)
(52) U.S. Cl.
CPC .............................. H02M 3/33592 (2013.01)
(58) Field of Classification Search
CPC ............ H02M 3/22; H02M 1/08; H02M 1/36; H02M 3/24; H02M 3/325; H02M 3/335;

(Continued)

(56) References Cited

U.S. PATENT DOCUMENTS

| | | | |
|---|---|---|---|
| 7,262,980 B2 | 8/2007 | Phadke et al. | |
| 7,499,299 B2 * | 3/2009 | Phadke ............. | H02M 3/33592 |
| | | | 363/127 |

(Continued)

FOREIGN PATENT DOCUMENTS

| | | |
|---|---|---|
| CN | 104836421 A | 8/2015 |
| CN | 109510481 A | 3/2019 |

(Continued)

OTHER PUBLICATIONS

Chinese First Office Action regarding Application No. 202310081587. 2, dated Dec. 26, 2025, with English translation.

(Continued)

*Primary Examiner* — Jeffrey A Gblende
(74) *Attorney, Agent, or Firm* — Harness, Dickey & Pierce, P.L.C.

(57) ABSTRACT

A synchronous rectification controller and a switching power supply are provided. The synchronous rectification controller includes: a power switch transistor, a drive circuit, a power supply control circuit, and a switch circuit including a plurality of power supply switch transistors; wherein the drive circuit is configured to control an on or off state of the power switch transistor, to make the synchronous rectification controller perform synchronous rectification or stop synchronous rectification; and the power supply control circuit is configured to control an on or off state of each power supply switch transistor in the switch circuit. With embodiments of the present disclosure, energy conversion efficiency may be improved to realize efficient power supply.

10 Claims, 5 Drawing Sheets

(58) Field of Classification Search
    CPC ...... H02M 3/28; H02M 3/01; H02M 3/33569;
                H02M 3/33507; H02M 2007/4815; H02M
                2007/4818; H02M 1/083; H02M 3/33538;
                H02M 3/33546; H02M 3/33515; H02M
                3/33576; H02M 3/33592; H02M 3/33553;
                H02M 3/33523; H02M 3/33561; H02M
                3/155; H02M 3/1582; H02M 1/4233;
                H02M 1/12; H02M 3/07; H02M 7/219;
                H02M 7/4815; H02M 1/0048; H02M
                7/4818; H02M 7/4826; H02M 7/4833;
                                          Y02B 70/1491
    See application file for complete search history.

(56)                  References Cited

U.S. PATENT DOCUMENTS 9,660,544  B1 *   5/2017   Telefus ............. H02M 3/33592
    9,837,901  B1 *   12/2017  Volk ...................... H02M 3/158
    11,817,790  B2 *   11/2023  Feng ....................... H02M 1/44
    11,942,930  B2 *   3/2024   Lo Verde ............. H10D 84/811
    2016/0344294  A1   11/2016  Zhang et al.
    2020/0161984  A1   5/2020   Xie et al.
    2024/0413761  A1 *  12/2024  Teggatz ............. H02M 1/0051

FOREIGN PATENT DOCUMENTS

CN          112421970  A     2/2021
    GB            2590057  A     6/2021

OTHER PUBLICATIONS

He Xudong et al., "Design of a New High Efficiency and High
Voltage Synchronous Rectifier Circuit", Chongqing Southwest Inte-
grated Circuit Design Co., Ltd; vol. 51, No. 3; Jun. 2021 (with
machine translated English abstract).

* cited by examiner

SYNCHRONOUS RECTIFICATION CONTROLLER AND SWITCHING POWER SUPPLY

CROSS-REFERENCE TO RELATED APPLICATION

This application claims priority to Chinese patent application Ser. No. 202310081587.2, filed on Jan. 16, 2023, and entitled "SYNCHRONOUS RECTIFICATION CON- TROLLER AND SWITCHING POWER SUPPLY", the entire disclosure of which is incorporated herein.

TECHNICAL FIELD

The present disclosure generally relates to switching power supply technology field, and more particularly, to a synchronous rectification controller and a switching power supply.

BACKGROUND

In recent years, with an increasing demand for power supply chips in the market, flyback switching power supply has been widely used due to its unique structure, lower cost and smaller size. Traditional diode rectification greatly reduces efficiency of power supply because of a large forward voltage drop. To improve conversion efficiency, a power Metal Oxide Semiconductor (MOS) transistor is used instead of a diode for rectification, and is controlled by a synchronous rectification controller. Electro Magnetic Interference (EMI) performance is relatively low in synchronous rectification low-side applications. Although common-mode noise can be cancelled through a transformer shielding layer, more turns are required, while high-side applications have better EMI performance. Therefore, planar transformers (i.e., transformers with high frequency, low shape, small height and high operating frequency) in fast charging applications preferably have high-side structures.

FIG. 1 and FIG. 2 illustrate two structures of high-side power supply of an existing synchronous rectification controller.

FIG. 1 is a schematic diagram of a circuit structure of an existing high-side synchronous rectification controller powered by an auxiliary winding. The controller mainly includes a power circuit and a control circuit. The power circuit includes a transformer T1, a primary side power transistor $Q_{SW1}$, a secondary side rectification power transistor $Q_{SR1}$ and a diode D0. The control circuit is a synchronous rectification controller 101. When the primary side power transistor $Q_{SW1}$ is turned on, a primary winding $N_{P1}$ of the transformer T1 is charged and stored with energy through an input source $V_{IN}$. When $Q_{SW1}$ is turned off and $Q_{R1}$ is turned on, the energy is induced to a secondary side winding $N_{S1}$ and an auxiliary winding $N_{aux}$ through winding mutual inductance of the transformer T1. The auxiliary winding $N_{aux}$ stores the energy on a capacitor C1 through the diode D0, and the capacitor C1 supplies power for the synchronous rectification controller.

FIG. 2 is a schematic diagram of a circuit structure of an existing high-side synchronous rectification controller using drain-side self-supply. The controller also includes a power circuit and a control circuit. The power circuit includes a transformer T2, a primary side power transistor $Q_{SW2}$, and a secondary side rectification power transistor $Q_{SR2}$. The control circuit is a synchronous rectification controller 201. The primary side power transistor $Q_{SW2}$ is turned on, and energy is stored in a primary winding $N_{P2}$ of the transformer T2. When $Q_{SW2S}$ is turned off and a secondary side $Q_{SR1}$ is turned on, the energy on the primary winding $N_{P2}$ is induced to a secondary winding $N_{S2}$. An output capacitor C0 stores the energy onto C2 through a voltage stabilizing circuit inside the synchronous rectification controller, so as to stably supply power to the synchronous rectification controller 201.

Both of the above two methods realize supplying power to the high-side synchronous rectification controller. However, there are many problems therein, mainly including following two aspects.

First, the power supply method in FIG. 1 adds an auxiliary winding for power supply, which not only increases a size of the transformer and reduces an integration level, but also increases application cost.

Second, FIG. 2 transfers the energy on the output capacitor C0 to the capacitor C2, and supplies power to the synchronous rectification controller through C2. Although no auxiliary winding is added, this self-power supply method has great loss, which seriously affects working efficiency of the system.

SUMMARY

Embodiments of the present disclosure provide a synchronous rectification controller and a switching power supply, which may improve energy conversion efficiency and realize efficient power supply.

In an embodiment of the present disclosure, a synchronous rectification controller is provided, including: a power switch transistor Q0, a drive circuit 303, a power supply control circuit 304, and a switch circuit; wherein the switch circuit includes a first switch transistor Q1, a second switch transistor Q2, a third switch transistor Q3, and a fourth switch transistor Q4; the first switch transistor Q1 is connected to a third output terminal of the power supply control circuit 304; the third switch transistor Q3 is connected to a first output terminal of the power supply control circuit 304; the second switch transistor Q2 and the fourth switch transistor Q4 are respectively connected to a second output terminal of the power supply control circuit 304; the drive circuit 303 is configured to control an on or off state of the power switch transistor Q0, to make the synchronous rectification controller perform synchronous rectification or stop synchronous rectification; and the power supply control circuit 304 is configured to control an on or off state of each power supply switch transistor in the switch circuit.

Optionally, the power switch transistor Q0, the first switch transistor Q1, the second switch transistor Q2, the third switch transistor Q3, and the fourth switch transistor Q4 are N-Metal-Oxide-Semiconductor (NMOS) transistors.

Optionally, the power switch transistor Q0 and the first switch transistor Q1 are integrated on a silicon slice, and are integrated in a same chip with a synchronous rectification control circuit that does not include a high-voltage device.

Optionally, a source of the power switch transistor Q0 is connected to an internal ground GND, a drain of the power switch transistor Q0 is connected to an external power supply VD, and a gate of the power switch transistor Q0 is connected to the drive circuit 303.

Optionally, a gate of the first switch transistor Q1 is connected to the third output terminal of the power supply control circuit 304, a source of the first switch transistor Q1 is connected to a source of the second switch transistor Q2, and a drain of the first switch transistor Q1 is connected to an external ground VSS; a gate of the second switch transistor Q2 is connected to the second output terminal of the power supply control circuit 304, and a drain of the second switch transistor Q2 is connected to an internal ground GND; a gate of the third switch transistor Q3 is connected to the second output terminal of the power supply control circuit 304, a source of the third switch transistor Q3 is connected to the internal ground GND, and a drain of the third switch transistor Q3 is connected to a source of the fourth switch transistor Q4; and a gate of the fourth switch transistor Q4 is connected to the second output terminal of the power supply control circuit 304, and a drain of the fourth switch transistor Q4 is connected to an internal power supply VDD.

In an embodiment of the present disclosure, a switching power supply is provided, including a transformer, a charge transfer circuit, and the above-mentioned synchronous rectification controller; wherein in a demagnetization stage of the transformer, the drive circuit 303 is configured to control the power switch transistor Q0 to be turned on, to make the synchronous rectification controller perform synchronous rectification, wherein energy stored in the transformer is transferred to the charge transfer circuit; and in a magnetization phase of the transformer, the drive circuit 303 is configured to control the power switch transistor Q0 to be turned off, to make the synchronous rectification controller stop synchronous rectification, and the charge transfer circuit is configured to supply power to the synchronous rectification controller.

Optionally, the power switch transistor Q0 is connected to a secondary high-voltage side of the transformer; the charge transfer circuit includes a power supply capacitor C3 and an energy storage capacitor C4; the power supply capacitor C3 is connected between the internal ground GND and the internal power supply VDD; the energy storage capacitor C4 is connected between the source of the first switch transistor Q1 and the drain of the third switch transistor Q3; in the demagnetization phase of the transformer, the energy stored in the transformer is transferred to the energy storage capacitor C4; and in the magnetization phase of the transformer, the energy on the energy storage capacitor C4 is transferred to the power supply capacitor C3 for storage, and the power supply capacitor C3 supplies power to the synchronous rectification controller.

Optionally, in the demagnetization stage of the transformer, the first output terminal of the power supply control circuit 304 outputs a high level, the second output terminal of the power supply control circuit 304 outputs a low level, the third switch transistor Q3 is turned on, and the second switch transistor Q2 and the fourth switch transistor Q4 are turned off; and in the magnetization phase of the transformer, the first output terminal of the power supply control circuit 304 outputs a low level, the second output terminal of the power supply control circuit 304 outputs a high level, the third switch transistor Q3 is turned off, and the second switch transistor Q2 and the fourth switch transistor Q4 are turned on.

Optionally, the power switch transistor Q0 is connected to a secondary low-voltage side of the transformer; the charge transfer circuit includes an energy storage capacitor C4; the energy storage capacitor C4 is connected between the internal power supply VDD and the internal ground GND; in the demagnetization stage of the transformer, the second output terminal of the power supply control circuit 304 outputs a high level, the fourth switch transistor Q4 is turned on, and the energy stored in the transformer is transferred to the energy storage capacitor C4; and in the magnetization phase of the transformer, the second output terminal of the power supply control circuit 304 outputs a low level, the fourth switch transistor Q4 is turned off, and the energy storage capacitor C4 supplies power to the synchronous rectification controller.

Optionally, a voltage on the energy storage capacitor C4 has a proportional relation with an output voltage $V_O$ of the transformer.

With the synchronous rectification controller and the switching power supply provided in the embodiments of the present disclosure, efficient power supply is realized through charge transfer by using switching of the switch transistors, which improves energy conversion efficiency of a system.

Further, the high-voltage power supply switch transistor and the power switch transistor are integrated on a silicon slice and integrated in a same chip with a synchronous rectification control circuit that does not include a high-voltage device, which improves reliability, greatly reduces an application volume of a system, and effectively reduces application cost.

Further, with the synchronous rectification controller provided in the embodiments of the present disclosure, sampling of an output voltage in high-side application can be realized.

Further, the synchronous rectification controller provided in the embodiments of the present disclosure can be applied not only to a secondary high-voltage side of a transformer, but also to a secondary low-voltage side of the transformer.

DETAILED DESCRIPTION

In order to clarify the objects, characteristics and advantages of the disclosure, embodiments of present disclosure will be described in detail in conjunction with accompanying drawings.

Figure 3:
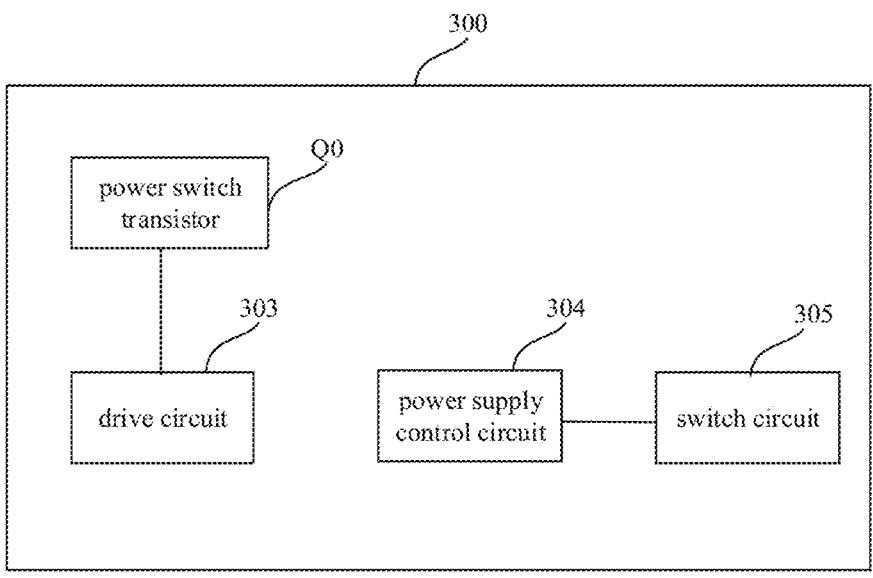
FIG. 3 is a block diagram of a synchronous rectification controller according to an embodiment.

Referring to FIG. 3, FIG. 3 is a block diagram of a synchronous rectification controller according to an embodiment.

The synchronous rectification controller 300 includes: a power switch transistor Q0, a drive circuit 303, a power supply control circuit 304, and a switch circuit 305 which includes a plurality of power supply switch transistors.

The drive circuit 303 is configured to control an on or off state of the power switch transistor Q0, to make the synchronous rectification controller 300 perform synchronous rectification or stop synchronous rectification.

The power supply control circuit 304 is configured to control an on or off state of each power supply switch transistor in the switch circuit 305.

Figure 4:
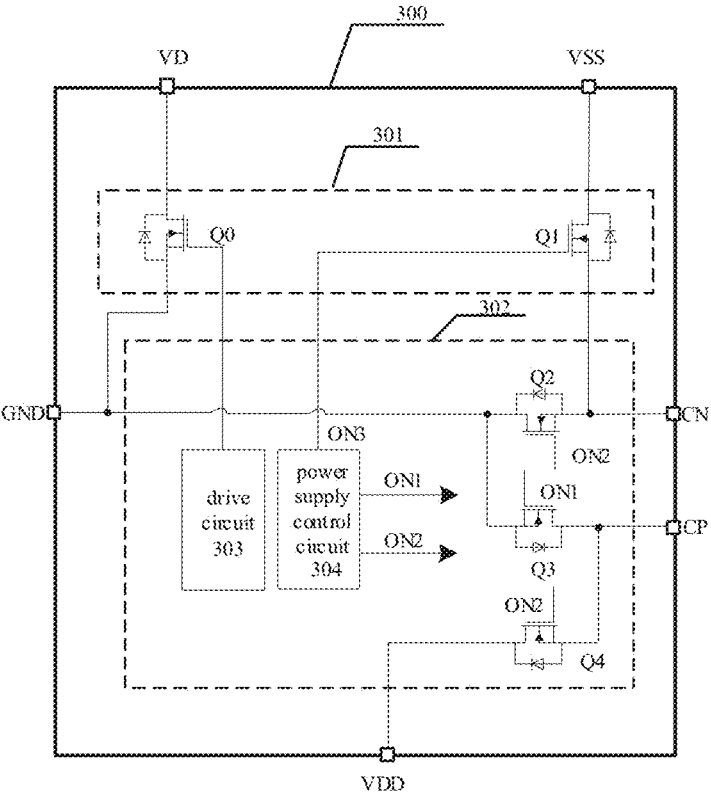
FIG. 4 is a schematic structural diagram of a synchronous rectification controller according to an embodiment.

Referring to FIG. 4, FIG. 4 is a schematic structural diagram of a synchronous rectification controller according to an embodiment.

Figure 1:
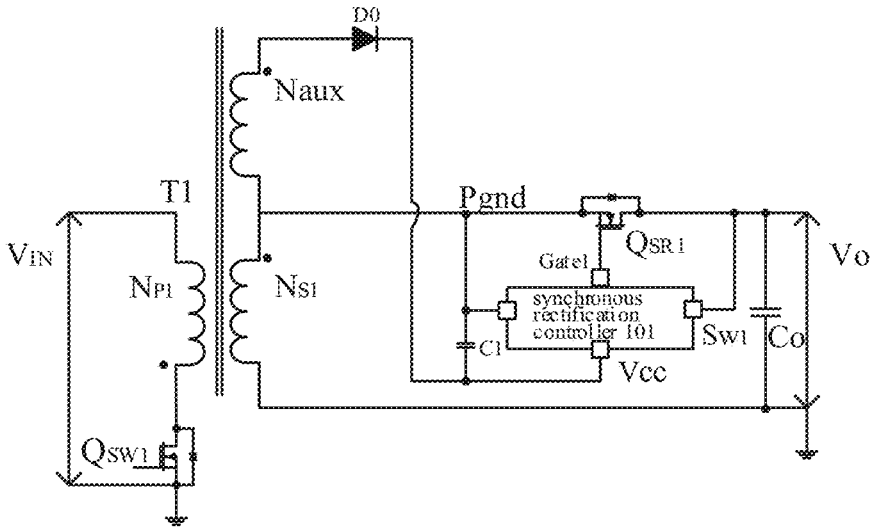
FIG. 1 is a schematic diagram of a circuit structure of an existing high-side synchronous rectification controller powered by an auxiliary winding.
Figure 2:
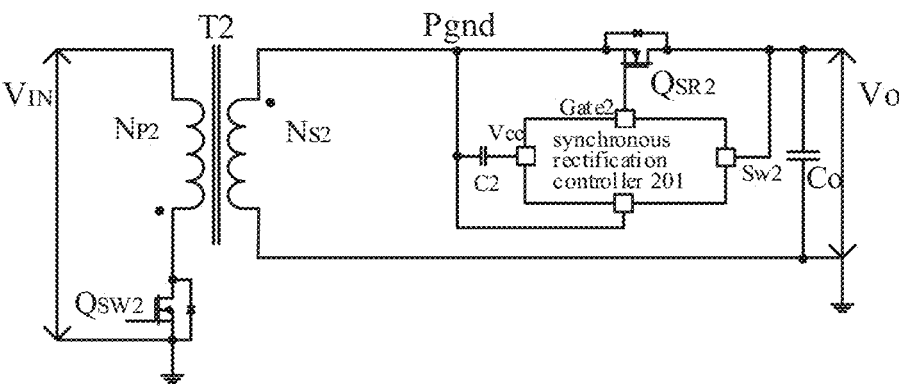
FIG. 2 is a schematic diagram of a circuit structure of an existing high-side synchronous rectification controller using drain-side self-supply.

In the embodiment, the switch circuit 305 in FIG. 1 includes a first switch transistor Q1, a second switch transistor Q2, a third switch transistor Q3, and a fourth switch transistor Q4.

The first switch transistor Q1 is connected to a third output terminal ON3 of the power supply control circuit 304.

The third switch transistor Q3 is connected to a first output terminal ON1 of the power supply control circuit 304.

The second switch transistor Q2 and the fourth switch transistor Q4 are respectively connected to a second output terminal ON2 of the power supply control circuit 304.

In non-restrictive embodiments, the power switch transistor Q0, the first switch transistor Q1, the second switch transistor Q2, the third switch transistor Q3, and the fourth switch transistor Q4 are NMOS transistors.

To save an application volume of a system, as illustrated in FIG. 4, the power switch transistor Q0 and the first switch transistor Q1 are integrated on a silicon slice, which then serves as a power and power supply module 301.

Taking NMOS transistors as an example, a connection manner of each NMOS transistor is described below with reference to FIG. 4.

As illustrated in FIG. 4, a source of the power switch transistor Q0 is connected to an internal ground GND, a drain of the power switch transistor Q0 is connected to an external power supply VD, and a gate of the power switch transistor Q0 is connected to the drive circuit 303.

A gate of the first switch transistor Q1 is connected to the third output terminal of the power supply control circuit 304, a source of the first switch transistor Q1 is connected to a source of the second switch transistor Q2, and a drain of the first switch transistor Q1 is connected to an external ground VSS.

A gate of the second switch transistor Q2 is connected to the second output terminal of the power supply control circuit 304, and a drain of the second switch transistor Q2 is connected to an internal ground GND.

A gate of the third switch transistor Q3 is connected to the second output terminal of the power supply control circuit 304, a source of the third switch transistor Q3 is connected to the internal ground GND, and a drain of the third switch transistor Q3 is connected to a source of the fourth switch transistor Q4.

A gate of the fourth switch transistor Q4 is connected to the second output terminal of the power supply control circuit 304, and a drain of the fourth switch transistor Q4 is connected to an internal power supply VDD.

With the above synchronous rectification controller, efficient power supply for the synchronous rectification controller is realized, which improves energy conversion efficiency of the system.

It should be noted that in practice, the synchronous rectification controller provided in the embodiments of the present disclosure can be applied to a secondary high-voltage side or low-voltage side of a transformer, which are described in detail below.

Accordingly, an embodiment of the present disclosure further provides a switching power supply. Referring to FIG.

Figure 5:
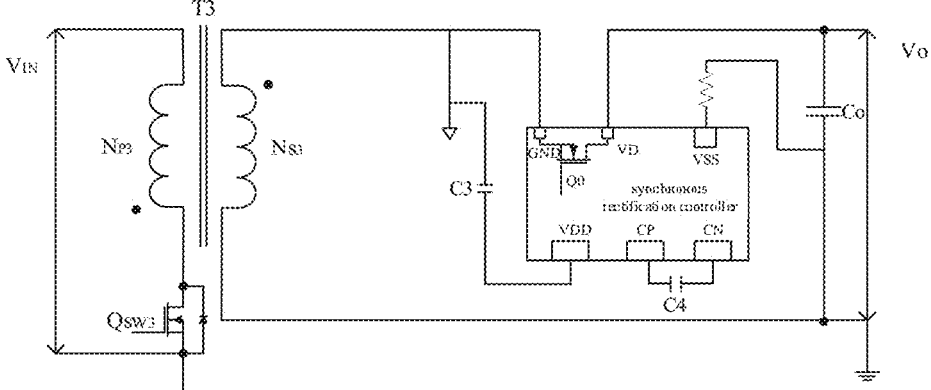
FIG. 5 is a functional schematic diagram of a switching power supply according to an embodiment.

5, FIG. 5 is a structural schematic diagram of a switching power supply according to an embodiment.

In the embodiment, the synchronous rectification controller 300 is applied to a secondary high side of a transformer T3. The switching power supply includes the transformer T3, a charge transfer circuit, and the above-mentioned synchronous rectification controller 300.

In FIG. 5, $N_{P3}$ and $N_{S3}$ are a primary winding and a secondary winding of the transformer T3 respectively. A primary power transistor $Q_{SW3}$ is arranged on a primary side of the transformer T3. A capacitor $C_O$ is a filter capacitor at an output terminal of the transformer T3. $V_O$ is an output voltage of the transformer T3, and $V_{IN}$ is an input source of a primary side of the transformer T3.

In some embodiments, the power switch transistor Q0 and the first switch transistor Q1 may be integrated together as the power and power supply module 301. The drive circuit 303, the power supply control circuit 304, and the other three switch transistors may be integrated together as a power supply setting module 302.

In a demagnetization stage of the transformer T3, the drive circuit 303 is configured to control the power switch transistor Q0 to be turned on, to make the synchronous rectification controller 300 perform synchronous rectification, wherein energy stored in the transformer T3 is transferred to the charge transfer circuit.

In a magnetization phase of the transformer T3, the drive circuit 303 is configured to control the power switch transistor Q0 to be turned off, to make the synchronous rectification controller 300 stop synchronous rectification, and the charge transfer circuit is configured to supply power to the synchronous rectification controller 300.

In the embodiment, the charge transfer circuit includes a power supply capacitor C3 and an energy storage capacitor C4.

The power supply capacitor C3 is connected between the internal ground GND and the internal power supply VDD.

The energy storage capacitor C4 is connected between the source CN of the first switch transistor Q1 and the drain CP of the third switch transistor Q3.

In the demagnetization phase of the transformer, the energy stored in the transformer is transferred to the energy storage capacitor C4.

In the magnetization phase of the transformer, the energy on the energy storage capacitor C4 is transferred to the power supply capacitor C3 for storage, and the power supply capacitor C3 supplies power to the synchronous rectification controller 300.

Figure 6:
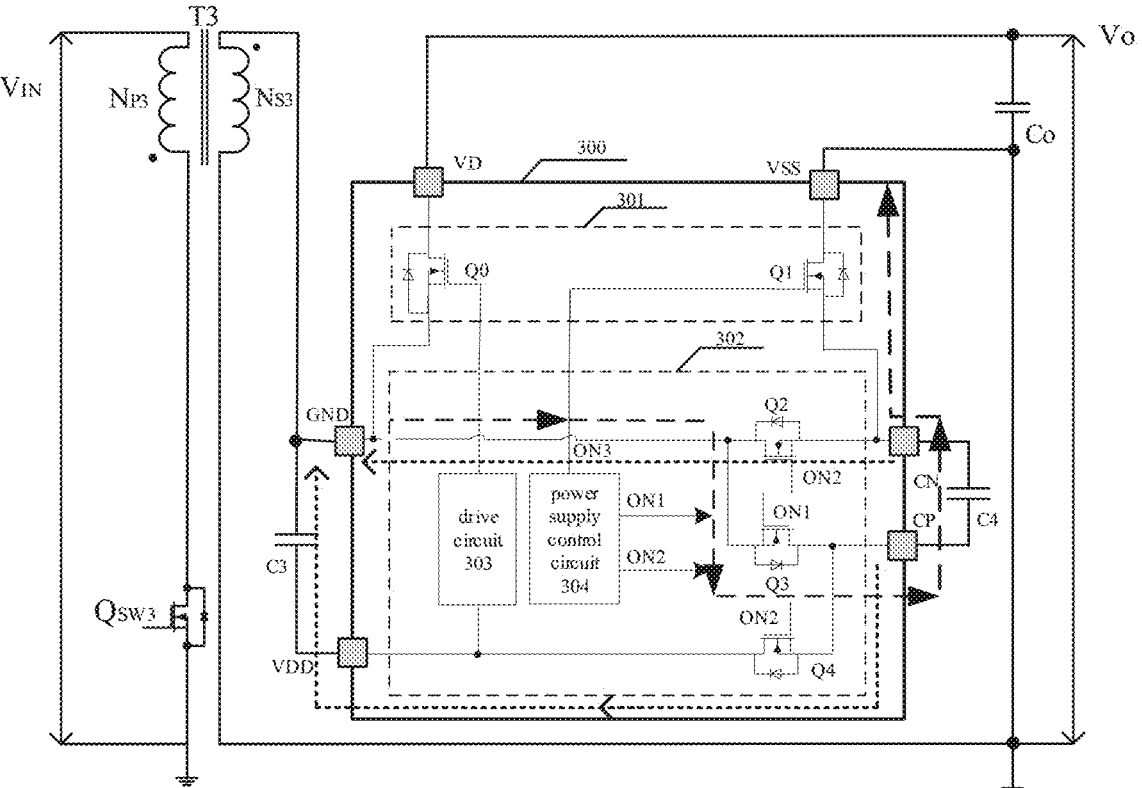
FIG. 6 is a schematic structural diagram of the switching power supply shown in FIG. 5.

To further specify a working process of the switching power supply, FIG. 6 illustrates a specific structure of the switching power supply.

Referring to FIG. 6, the working process of the switching power supply is as follows.

When the primary power transistor $Q_{SW3}$ is turned on, the primary winding $N_{P3}$ of the transformer T3 is charged and stored with energy through the input source $V_{IN}$, and the transformer T3 enters the magnetization stage. When the primary power transistor $Q_{SW3}$ is turned off, the transformer T3 enters the demagnetization phase, where the energy is induced to the secondary winding $N_{S3}$ through winding mutual inductance of the transformer T3.

When the transformer T3 enters the demagnetization stage, the driving circuit 303 outputs a high level to control the power switch transistor Q0 to be turned on, to make the secondary side of the transformer T3 start rectification. At this time, the third output terminal ON3 of the power supply control circuit 304 outputs a high level to control the first switch transistor Q1 to be turned on, the first output terminal ON1 of the power supply control circuit 304 outputs a high level to control the third switch transistor Q3 to be turned on, and the second output terminal ON2 of the power supply control circuit 304 outputs a low level to control the second switch transistor Q2 and the fourth switch transistor Q4 to be turned off, so as to form a path from a dotted terminal of the secondary side of the transformer T3 to the external ground VSS through the third switch transistor Q3 and the capacitor C4. This path partially transfers the energy stored on the secondary winding $N_{S3}$ of the transformer T3 in the demagnetization stage to the energy storage capacitor C4 for temporary storage. This process not only completes the charge transfer, but also makes a voltage on the energy storage capacitor C4 have a proportional relation with the output voltage $V_O$ of the transformer T3, so that the output voltage $V_O$ can be sampled.

When the transformer T3 enters the magnetization stage, the drive circuit 303 outputs a low level to control the power switch transistor Q0 to be turned off, and the synchronous rectification controller 300 does not perform rectification. At this time, the third output terminal of the power supply control circuit 304 outputs a low level to control the first switch transistor Q1 to be turned off, the first output terminal ON1 of the power supply control circuit 304 outputs a low level to control the third switch transistor Q3 to be turned off, the second output terminal ON2 of the power supply control circuit 304 outputs a high level to control the second switch transistor Q2 and the fourth switch transistor Q4 to be turned on, so as to form two paths on the energy storage capacitor C4. A first path is to connect a lower plate of the energy storage capacitor C4 to the external ground GND through the second switch transistor Q2, and a second path is to connect an upper plate of the energy storage capacitor C4 to the internal power supply VDD through the fourth switch transistor Q4. In this process, the energy storage capacitor C4 is connected in parallel with the power supply capacitor C3, thereby realizing charge sharing. The energy stored in the energy storage capacitor C4 in the demagnetization phase is transferred to the power supply capacitor C3 for storage, and power supply to the synchronous rectification controller 300 is realized.

Figure 7:
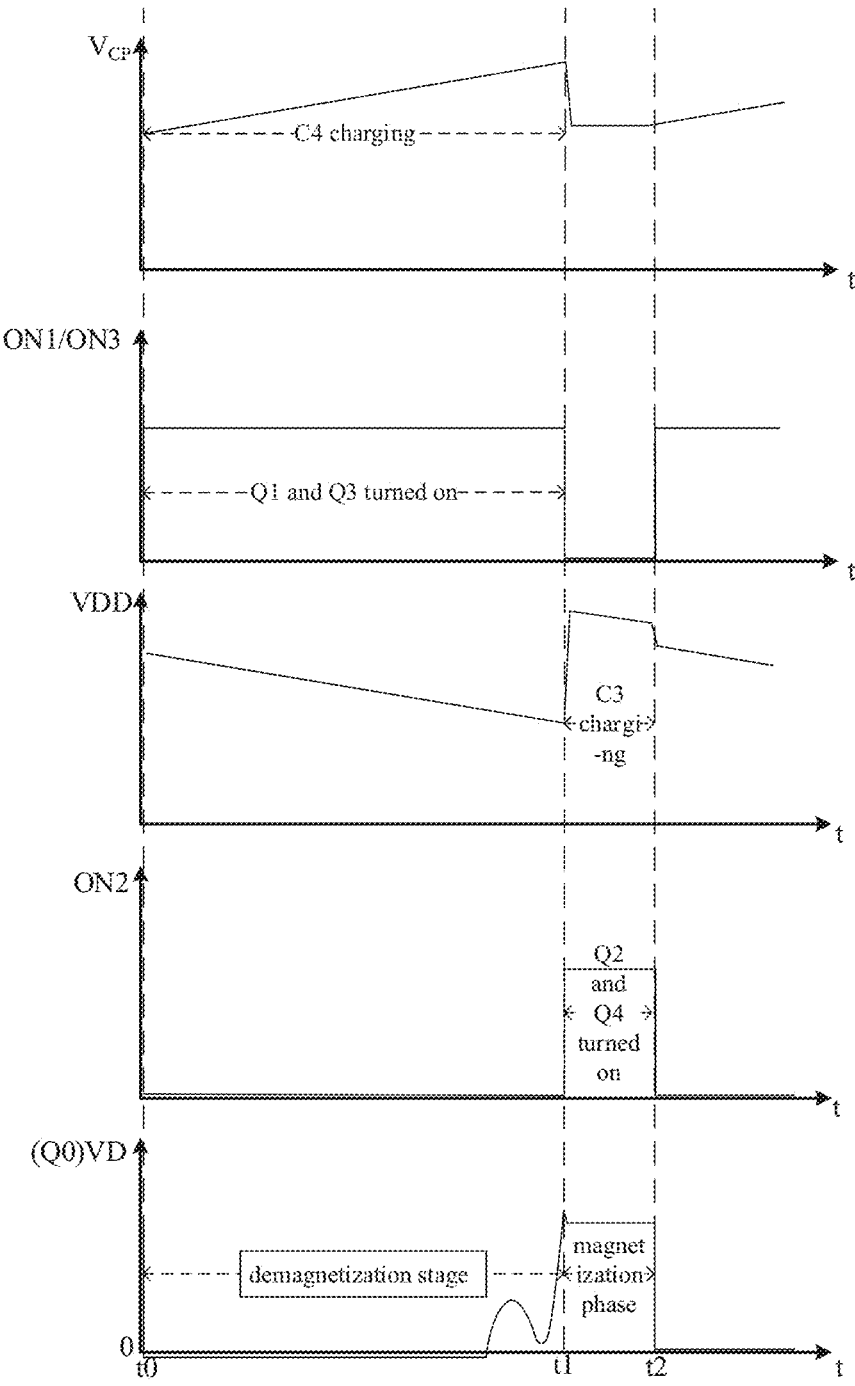
FIG. 7 is a working waveform diagram of a synchronous rectification controller in the switching power supply shown in FIG. 6.

FIG. 7 is a working waveform diagram of the synchronous rectification controller in the switching power supply shown in FIG. 6.

From t0 to t1, the transformer T3 enters the demagnetization stage. The drive circuit 303 outputs a high level to control the power switch transistor Q0 to be turned on. After the power switch transistor Q0 is turned on, a voltage difference between the drain and the source of the power switch transistor Q0 is 0 in an ideal situation, that is, a voltage of a source node VD of the power switch transistor is zero. The second output terminal ON2 of the power supply control circuit 304 outputs a low level, and the first output terminal ON1 and the third output terminal ON3 of the power supply control circuit 304 output a high level, thus, the second switch transistor Q2 and the fourth switch transistor Q4 are turned off, and the first switch transistor Q1 and the third switch transistor Q3 are turned on. In this situation, part of the energy of the transformer T3 starts to charge the energy storage capacitor C4. At a moment t1, a voltage $V_{CP}$ on the energy storage capacitor C4 reaches a maximum voltage.

From t1 to t2, the transformer T3 enters the magnetization stage. The power switch transistor Q0 receives a low-level signal from the drive circuit 303 and is turned off, that is, a voltage drop from the drain to the source of the power switch transistor Q0 becomes a voltage drop from the output voltage $V_O$ to the ground. In this process, the second output terminal ON2 of the power supply control circuit 304 outputs a high level, and the first output terminal ON1 and the third output terminal ON3 of the power supply control circuit 304 output a low level, which makes the second switch transistor Q2 and the fourth switch transistor Q4 be turned on, and the first switch transistor Q1 and the third switch transistor Q3 be turned off. At this stage, the energy storage capacitor C4 and the power supply capacitor C3 are in a parallel state. The energy stored in the energy storage capacitor C4 during a period from t0 to t1 is transferred to the power supply capacitor C3, and the voltage VDD on the power supply capacitor C3 reaches the highest at this time. As the synchronous rectification controller 300 needs to be powered, in a period from t1 to t2, the voltage VDD on the power supply capacitor C3 may be lowered.

Figure 8:
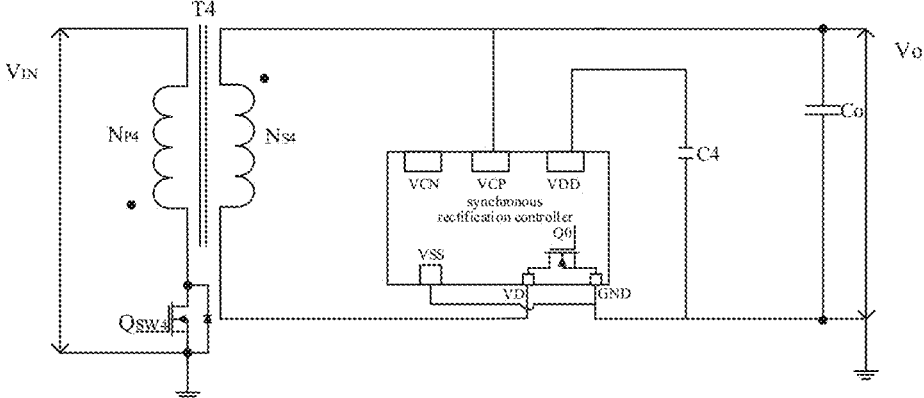
FIG. 8 is another functional schematic diagram of a switching power supply according to an embodiment.

FIG. 8 is another functional schematic diagram of a switching power supply according to an embodiment.

In the embodiment, the synchronous rectification controller 300 is applied to a secondary low side of a transformer T4. The switching power supply includes the transformer T4, a charge transfer circuit, and the above-mentioned synchronous rectification controller 300.

In FIG. 8, $N_{P4}$ and $N_{S4}$ are a primary winding and a secondary winding of the transformer T4 respectively. A primary power transistor $Q_{SW4}$ is arranged on a primary side of the transformer T4. A capacitor $C_O$ is a filter capacitor at an output terminal of the transformer T4. $V_O$ is an output voltage of the transformer T4, and $V_{IN}$ is an input source of a primary side of the transformer T4.

In some embodiments, the power switch transistor Q0 and the first switch transistor Q1 may be integrated together as the power and power supply module 301. The drive circuit 303, the power supply control circuit 304, and the other three switch transistors may be integrated together as a power supply setting module 302.

In a demagnetization stage of the transformer T4, the drive circuit 303 is configured to control the power switch transistor Q0 to be turned on, to make the synchronous rectification controller 300 perform synchronous rectification, wherein energy stored in the transformer T4 is transferred to the charge transfer circuit.

In a magnetization phase of the transformer T4, the drive circuit 303 is configured to control the power switch transistor Q0 to be turned off, to make the synchronous rectification controller 300 stop synchronous rectification, and the charge transfer circuit is configured to supply power to the synchronous rectification controller 300.

In the embodiment, the charge transfer circuit includes an energy storage capacitor C4 that is connected between the internal ground GND and the internal power supply VDD.

In the demagnetization phase of the transformer, the second output terminal ON2 of the power supply control circuit 304 outputs a high level, and the fourth switch transistor Q4 is turned on. The energy stored in the transformer T4 is transferred to the energy storage capacitor C4.

In the magnetization phase of the transformer, the second output terminal ON2 of the power supply control circuit 304 outputs a low level, the fourth switch transistor Q4 is turned off, and the energy storage capacitor C4 supplies power to the synchronous rectification controller 300.

Figure 9:
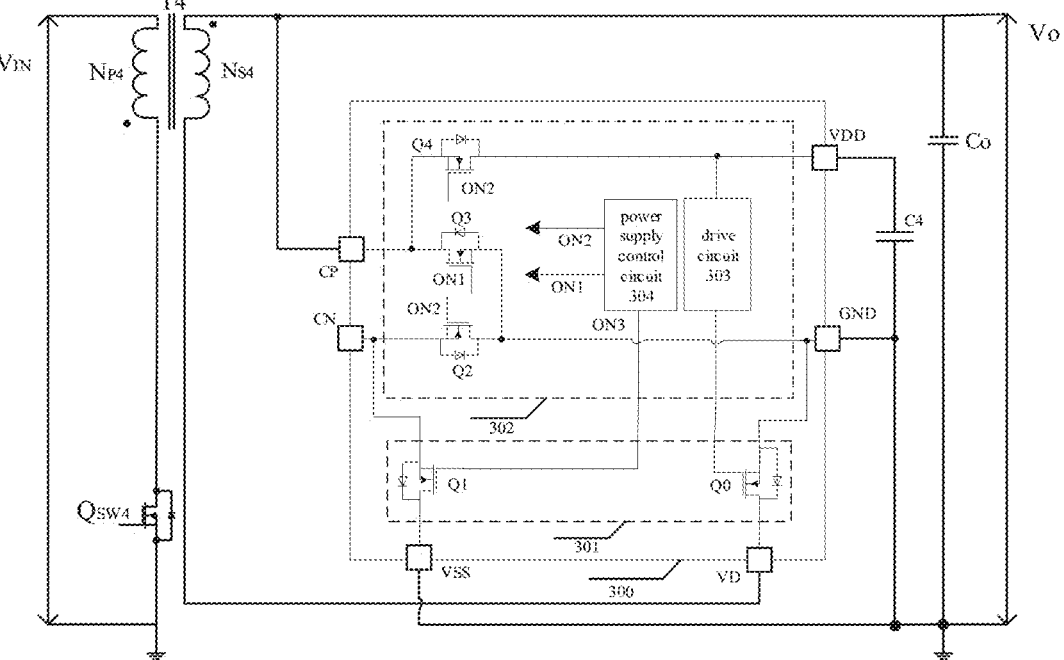
FIG. 9 is a schematic structural diagram of the switching power supply shown in FIG. 8.

To further specify a working process of the switching power supply, FIG. 9 illustrates a specific structure of the switching power supply.

Referring to FIG. 9, the working process of the switching power supply is as follows.

When the primary power transistor $Q_{SW4}$ is turned on, the primary winding $N_{P4}$ of the transformer T4 is charged and stored with energy through the input source $V_{IN}$, and the transformer T4 enters the magnetization stage. When the primary power transistor $Q_{SW4}$ is turned off, the transformer T4 enters the demagnetization phase, where the energy is induced to the secondary winding $N_{S4}$ through winding mutual inductance of the transformer T4.

When the transformer T4 enters the demagnetization stage, the driving circuit 303 outputs a high level to control the power switch transistor Q0 to be turned on, to make the secondary side of the transformer T4 start rectification. At this time, the second output terminal ON2 of the power supply control circuit 304 outputs a high level to control the fourth switch transistor Q4 to be turned on, so as to form a current path from a dotted terminal of the secondary winding $N_{S4}$ of the transformer T4 to a source node CP of the fourth switch transistor Q4 to the energy storage capacitor C4 to a heteronymous terminal of the secondary winding $N_{S4}$ of the transformer T4. This path partially transfers the energy stored on the secondary winding $N_{S4}$ of the transformer T4 in the demagnetization stage to the energy storage capacitor C4 for temporary storage. This process not only completes the charge transfer, but also makes a voltage on the energy storage capacitor C4 have a proportional relation with the output voltage $V_O$ of the transformer T4, so that the output voltage $V_O$ can be sampled.

When the transformer T4 enters the magnetization stage, the drive circuit 303 outputs a low level to control the power switch transistor Q0 to be turned off, and the synchronous rectification controller 300 does not perform rectification. At this time, the second output terminal ON2 of the power supply control circuit 304 outputs a low level to control the fourth switch transistor Q4 to be turned off, and the energy storage capacitor C4 supplies power to the synchronous rectification controller 300 using the energy stored in the demagnetization stage.

With the synchronous rectification controller and the switching power supply provided in the embodiments of the present disclosure, efficient power supply is realized through charge transfer by using switching of the switch transistors, which improves energy conversion efficiency of a system.

It should be understood that the term "and/or" in the present disclosure is merely an association relationship describing associated objects, indicating that there can be three types of relationships, for example, A and/or B can represent "A exists only, both A and B exist, B exists only. In addition, the character "/" in the present disclosure represents that the former and latter associated objects have an "or" relationship.

The "plurality" in the embodiments of the present disclosure refers to two or more.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

In the above embodiments of the present disclosure, it should be understood that the disclosed method and device may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in an electrical, mechanical or other form.

In addition, functional units in the embodiments of the present disclosure may be integrated in one processing unit, or each unit may be physically separate, or two or more units may be integrated in one unit. The integrated units can be realized in a form of hardware, or in a form of hardware plus a software functional unit.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A synchronous rectification controller, comprising a power switch transistor (Q0), a drive circuit (303), a power supply control circuit (304), and a switch circuit;
   wherein the switch circuit comprises a first switch transistor (Q1), a second switch transistor (Q2), a third switch transistor (Q3), and a fourth switch transistor (Q4);
   the first switch transistor (Q1) is connected to a third output terminal of the power supply control circuit (304);
   the third switch transistor (Q3) is connected to a first output terminal of the power supply control circuit (304);
   the second switch transistor (Q2) and the fourth switch transistor (Q4) are respectively connected to a second output terminal of the power supply control circuit (304);
   the drive circuit (303) is configured to control an on or off state of the power switch transistor (Q0), to make the synchronous rectification controller perform synchronous rectification or stop synchronous rectification; and
   the power supply control circuit (304) is configured to control an on or off state of each power supply switch transistor in the switch circuit;
   wherein the power switch transistor (Q0), the first switch transistor (Q1), the second switch transistor (Q2), the third switch transistor (Q3), and the fourth switch transistor (Q4) are N-Metal-Oxide-Semiconductor (NMOS) transistors;
   wherein a gate of the first switch transistor (Q1) is connected to the third output terminal of the power supply control circuit (304), a source of the first switch transistor (Q1) is connected to a source of the second switch transistor (Q2), and a drain of the first switch transistor (Q1) is connected to an external ground (VSS);
   a gate of the second switch transistor (Q2) is connected to the second output terminal of the power supply control circuit (304), and a drain of the second switch transistor (Q2) is connected to an internal ground (GND);
   a gate of the third switch transistor (Q3) is connected to the second output terminal of the power supply control circuit (304), a source of the third switch transistor (Q3) is connected to the internal ground (GND), and a drain of the third switch transistor (Q3) is connected to a source of the fourth switch transistor (Q4); and
   a gate of the fourth switch transistor (Q4) is connected to the second output terminal of the power supply control circuit (304), and a drain of the fourth switch transistor (Q4) is connected to an internal power supply (VDD).

2. The synchronous rectification controller according to claim 1, wherein the power switch transistor (Q0) and the first switch transistor (Q1) are integrated on a silicon slice, and are integrated in a same chip with a synchronous rectification control circuit that does not comprise a high-voltage device.

3. The synchronous rectification controller according to claim 1, wherein a source of the power switch transistor (Q0) is connected to an internal ground (GND), a drain of the power switch transistor (Q0) is connected to an external power supply (VD), and a gate of the power switch transistor (Q0) is connected to the drive circuit (303).

4. A switching power supply, comprising a transformer, a charge transfer circuit, and the synchronous rectification controller of claim 1;

wherein in a demagnetization stage of the transformer, the drive circuit (303) is configured to control the power switch transistor (Q0) to be turned on, to make the synchronous rectification controller perform synchronous rectification, wherein energy stored in the transformer is transferred to the charge transfer circuit; and in a magnetization phase of the transformer, the drive circuit (303) is configured to control the power switch transistor (Q0) to be turned off, to make the synchronous rectification controller stop synchronous rectification, and the charge transfer circuit is configured to supply power to the synchronous rectification controller.

5. The switching power supply according to claim 4, wherein the power switch transistor (Q0) is connected to a secondary high-voltage side of the transformer;

the charge transfer circuit comprises a power supply capacitor (C3) and an energy storage capacitor (C4);

the power supply capacitor (C3) is connected between the internal ground (GND) and the internal power supply (VDD);

the energy storage capacitor (C4) is connected between the source of the first switch transistor (Q1) and the drain of the third switch transistor (Q3);

in the demagnetization phase of the transformer, the energy stored in the transformer is transferred to the energy storage capacitor (C4); and in the magnetization phase of the transformer, the energy on the energy storage capacitor (C4) is transferred to the power supply capacitor (C3) for storage, and the power supply capacitor (C3) supplies power to the synchronous rectification controller.

6. The switching power supply according to claim 5, wherein in the demagnetization stage of the transformer, the first output terminal of the power supply control circuit (304) outputs a high level, the second output terminal of the power supply control circuit (304) outputs a low level, the third switch transistor (Q3) is turned on, and the second switch transistor (Q2) and the fourth switch transistor (Q4) are turned off; and in the magnetization phase of the transformer, the first output terminal of the power supply control circuit (304) outputs a low level, the second output terminal of the power supply control circuit (304) outputs a high level, the third switch transistor (Q3) is turned off, and the second switch transistor (Q2) and the fourth switch transistor (Q4) are turned on.

7. The switching power supply according to claim 4, wherein the power switch transistor (Q0) is connected to a secondary low-voltage side of the transformer;

the charge transfer circuit comprises an energy storage capacitor (C4);

the energy storage capacitor (C4) is connected between the internal power supply (VDD) and the internal ground (GND);

in the demagnetization stage of the transformer, the second output terminal of the power supply control circuit (304) outputs a high level, the fourth switch transistor (Q4) is turned on, and the energy stored in the transformer is transferred to the energy storage capacitor (C4); and in the magnetization phase of the transformer, the second output terminal of the power supply control circuit (304) outputs a low level, the fourth switch transistor (Q4) is turned off, and the energy storage capacitor (C4) supplies power to the synchronous rectification controller.

8. The switching power supply according to claim 5, wherein a voltage on the energy storage capacitor (C4) has a proportional relation with an output voltage (Vo) of the transformer.

9. The switching power supply according to claim 6, wherein a voltage on the energy storage capacitor (C4) has a proportional relation with an output voltage (Vo) of the transformer.

10. The switching power supply according to claim 7, wherein a voltage on the energy storage capacitor (C4) has a proportional relation with an output voltage (Vo) of the transformer.

* * * * *